United States Patent
Torres

(10) Patent No.: US 12,218,590 B2
(45) Date of Patent: Feb. 4, 2025

(54) SOFT START FOR BUCK CONVERTER

(71) Applicant: STMicroelectronics International N.V., Geneva (CH)

(72) Inventor: Antonino Torres, Catania (IT)

(73) Assignee: STMicroelectronics International N.V., Geneva (CH)

( * ) Notice: Subject to any disclaimer, the term of this patent is extended or adjusted under 35 U.S.C. 154(b) by 179 days.

(21) Appl. No.: 18/066,765

(22) Filed: Dec. 15, 2022

(65) Prior Publication Data

US 2024/0204663 A1    Jun. 20, 2024

(51) Int. Cl.
| | |
|---|---|
| *H02M 1/08* | (2006.01) |
| *H02M 1/36* | (2007.01) |
| *H02M 3/157* | (2006.01) |
| *H02M 3/158* | (2006.01) |

(52) U.S. Cl.
CPC ............ *H02M 3/157* (2013.01); *H02M 1/08* (2013.01); *H02M 1/36* (2013.01); *H02M 3/158* (2013.01)

(58) Field of Classification Search
CPC .......... H02M 1/08; H02M 1/36; H02M 3/157; H02M 3/158
USPC .................................. 327/530, 538, 540, 541
See application file for complete search history.

(56) References Cited

U.S. PATENT DOCUMENTS

| | | | | |
|---|---|---|---|---|
| 2006/0039224 | A1* | 2/2006 | Lotfi ..................... | G11C 5/14 365/185.05 |
| 2015/0194880 | A1* | 7/2015 | Wibben ................ | H02M 3/156 323/282 |
| 2020/0228012 | A1* | 7/2020 | Lynch .................. | H02M 3/158 |

* cited by examiner

*Primary Examiner* — William Hernandez
(74) *Attorney, Agent, or Firm* — Slater Matsil, LLP

(57) ABSTRACT

An integrated circuit device includes: a Buck converter; and a control circuit for the Buck converter, which includes: a comparator configured to compare a feedback voltage of the Buck converter with a reference voltage that increases from a first voltage to a second voltage; a pulse-width modulator configured to generate a pulse-width modulated (PWM) signal having a timing-varying pulse width proportional to the reference voltage; an AND gate configured to generate a first control signal by performing a logic AND operation on an output of the comparator and the PWM signal; a pulse generator configured to generate a second control signal by generating a pulse in response to a rising edge in the output of the comparator; and a selection circuit configured to, based on an output voltage of the Buck converter, select the first control signal or the second control signal as a control signal for the Buck converter.

20 Claims, 6 Drawing Sheets

SOFT START FOR BUCK CONVERTER

TECHNICAL FIELD

The present invention relates generally to switched-mode power supply (SMPS), and in particular embodiments, to Buck converters with a soft start function.

BACKGROUND

Power converters are pervasive in many electronic applications from computers to automobiles. In some embodiments, voltages within a power converter are generated by performing a DC-DC, DC-AC, and/or AC-DC conversion by operating a switch loaded with an inductor or transformer. Examples of power converters include switched mode power supplies (SMPS) and linear regulators. An SMPS is usually more efficient than other types of power conversion systems because power conversion is performed by controlled charging and discharging of the inductor or transformer and reduces energy lost due to power dissipation across resistive voltage drops.

An SMPS usually includes at least one switch (also referred to as a power switch) and an inductor or transformer. Some specific topologies include Buck converters, boost converters, and flyback converters, among others. A control circuit is commonly used to open and close the switches to charge and discharge the inductor. In some applications, the current supplied to the load and/or the voltage supplied to the load is controlled via a feedback loop. In some typologies, the switches used in the SMPS are implemented using cascode switches. Linear regulator is another class of power converter where a pass transistor is controlled (e.g., turned on and off) by a controller to provide a steady voltage to an external load.

Buck converter is a popular choice of SMPS and is often used to provide power for a downstream device such as a sensor or a processor. To avoid or alleviate performance issues with Buck converter, such as inrush current at startup or overshoot of output voltage, soft start of Buck converter is desired. There is a need in the art for Buck converter with good soft start performance.

SUMMARY

In accordance with an embodiment, a switched-mode power supply (SMPS) includes a Buck converter and a control circuit for the Buck converter. The control circuit includes: a comparator configured to compare a feedback voltage of the Buck converter with a reference voltage that increases from a first voltage to a second voltage; a pulse-width modulator configured to generate a pulse-width modulated (PWM) signal, wherein a pulse width of the PWM signal is timing-varying and is proportional to a value of the reference voltage; an AND gate, wherein a first input terminal of the AND gate and a second input terminal of the AND gate are coupled to an output terminal of the comparator and an output terminal of the pulse-width modulator, respectively; a pulse generator coupled to the output terminal of the comparator and configured to generate a pulse in response to a rising edge in an output signal of the comparator; and a selection circuit coupled to the AND gate and the pulse generator, wherein the selection circuit is configured to, based on an output voltage of the Buck converter, select an output of the AND gate or an output of the pulse generator as an output of the selection circuit, wherein the Buck converter is configured to be controlled by the output of the selection circuit.

In accordance with an embodiment, an integrated circuit (IC) device includes: a Buck converter and a control circuit for the Buck converter. The control circuit includes: a comparator configured to compare a feedback voltage of the Buck converter with a reference voltage that increases from a first voltage to a second voltage; a pulse-width modulator configured to generate a pulse-width modulated (PWM) signal having a timing-varying pulse width that is proportional to a value of the reference voltage; an AND gate configured to generate a first control signal by performing a logic AND operation on an output signal of the comparator and the PWM signal; a pulse generator configured to generate a second control signal by generating a pulse in response to a rising edge in the output signal of the comparator; and a selection circuit configured to, based on an output voltage of the Buck converter, select the first control signal or the second control signal as a control signal for the Buck converter.

In accordance with an embodiment, a method of starting a Buck converter includes: supplying a reference voltage to a control circuit for the Buck converter, wherein the reference voltage increases from a first voltage to a second voltage; comparing an output voltage of the Buck converter with a pre-determined threshold; in response to detecting that the output voltage of the Buck converter is lower than the pre-determined threshold, driving the Buck converter with a first control signal, wherein the first control signal comprises a first plurality of pulses having a time-varying pulse width that is proportional with the reference voltage; and in response to detecting that the output voltage of the Buck converter is high than the pre-determined threshold, driving the Buck converter with a second control signal, wherein the second control signal comprises a second plurality of pulses with a pulse width proportional to a ratio between the output voltage of the Buck converter and an supply voltage of the Buck converter.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EXAMPLES

Figure 1:
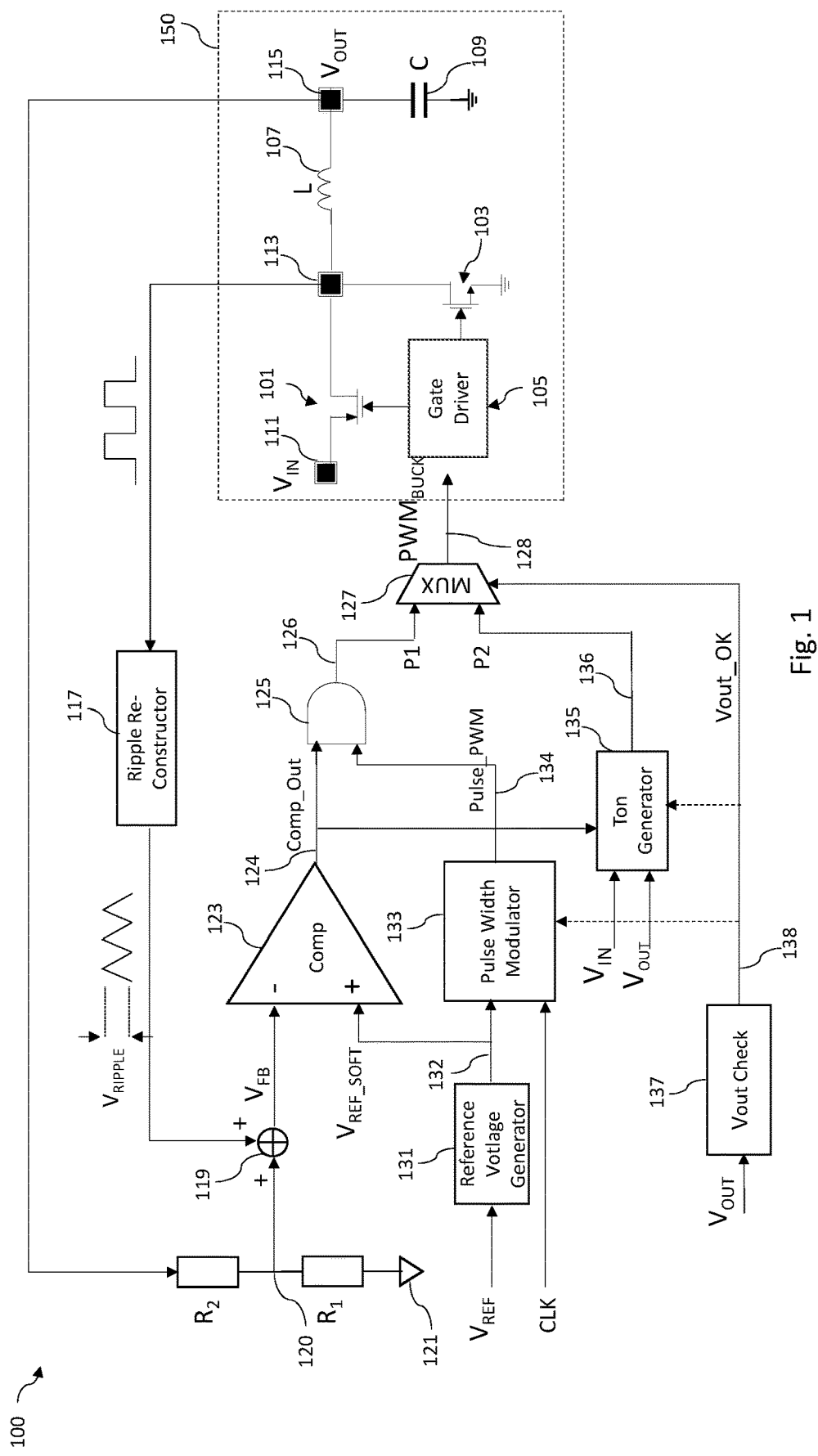
FIG. 1 illustrates a block diagram of a switched-mode power supply (SMPS), in an embodiment.

The making and using of the presently disclosed examples are discussed in detail below. It should be appreciated, however, that the present invention provides many applicable inventive concepts that can be embodied in a wide variety of specific contexts. The specific examples discussed are merely illustrative of specific ways to make and use the invention, and do not limit the scope of the invention. Throughout the discussion herein, unless otherwise specified, the same or similar reference numerals or labels in different figures refer to the same or similar component or signal.

The present disclosure will be described with respect to examples in a specific context, namely a Buck converter with a control circuit that performs a soft start for the Buck converter. The soft start of the Buck converter is also referred to as a soft startup process of the Buck converter.

FIG. 1 illustrates a block diagram of a switched-mode power supply (SMPS) 100, in an embodiment. The SMPS 100 in FIG. 1 is a Buck converter with a control circuit that achieves a soft start for the Buck converter. As will be discussed in more details hereinafter, during the soft startup process, a reference voltage, which increases from a first value (e.g., zero voltage) to a second value (e.g., a voltage $V_{REF}$) over a period of time, is supplied to the control circuit of the Buck converter. The control circuit, based on the reference voltage and the output voltage of the Buck converter, generates a control signal (e.g., a $PWM_{BUCK}$ signal) to drive the Buck converter, such that the output voltage of the Buck converter increases from zero to a steady state output voltage over the period of time.

In FIG. 1, components within the dashed box 150 illustrate a Buck converter. Components outside the dashed box 150 form the control circuit for the Buck converter. In some embodiments, the SMPS 100 of FIG. 1 (or portions of the SMPS 100) is formed as an integrated circuit (IC) device or a portion of an IC device. An example of the IC device is a power-management integrated circuit (PMIC) device.

Referring to FIG. 1, the Buck converter includes switches 101 and 103, a gate driver circuit 105, an inductor 107, and a capacitor 109. In the example of FIG. 1, the switch 101 is a P-type transistor, and the switch 103 is an N-type transistor. The switch 101 is coupled between an input/output (I/O) pin 111 (also referred to as an I/O terminal, or an I/O port) of the SMPS 100 and an I/O pin 113 of the SMPS 100, the switch 103 is coupled between the I/O pin 113 and a reference voltage (e.g., electrical ground). The gate driver circuit 105 receives a control signal 128 (e.g., a pulse-width modulated (PWM) signal) for the Buck converter, and generates control signals (e.g., gate control signals) for the switches 101 and 103, e.g., by amplifying and/or voltage-shifting the control signal 128. Note that due to the switches 101 and 103 being different types (e.g., N-type or P-type) of transistors, the control signal 128 sets the switches 101 and 103 in opposite states (e.g., ON state or OFF state) during operation. In other words, during operation of the Buck converter, the switch 101 is closed when the switch 103 is open, and switch 101 is open when the switch 103 is closed.

In the example of FIG. 1, the inductor 107 is coupled between the I/O pin 113 and an I/O pin 115 of the SMPS 100, and the capacitor 109 is coupled between the I/O pin 115 and a reference voltage (e.g., electrical ground). In the illustrated embodiment, the I/O pin 111 is configured to receive a supply voltage $V_{IN}$ for the Buck converter, and the I/O pin 115 is configured to output the Buck converter output voltage $V_{OUT}$.

In some embodiments, when the SMPS 100 of FIG. 1 is integrated in an IC device, the inductor 107 and the capacitor 109 are not integrated into the IC device, and are implemented as external components connected to the IC device. This may be due to difficulties in integrating inductors and capacitors with large nominal values (e.g., large inductance or large capacitance) into the IC device. However, integrating the inductor 107 and the capacitor 109 into the IC device comprising the SMPS 100 is contemplated within the scope of the present disclosure.

The Buck converter illustrated in FIG. 1 is merely a non-limiting example. Variations are possible and are fully intended to be included within the scope of the present disclosure. For example, the switch 103 in FIG. 1 may be replaced by a diode with its cathode connected to the I/O pin 113 and its anode connected to the reference voltage (e.g., electrical ground).

The control circuit for the Buck converter and the operation of the Buck converter are discussed hereinafter.

Still referring to FIG. 1, the output voltage $V_{OUT}$ of the Buck converter is sent to a voltage divider formed by resistors $R_1$ and $R_2$, which are coupled between the I/O pin 115 and a reference node 121. The reference node 121 is coupled to electrical ground, in an embodiment. The output of the voltage divider at a node 120 is added with a ripple voltage $V_{RIPPLE}$ by an adder circuit 119 to form a feedback voltage $V_{FB}$, which feedback voltage $V_{FB}$ is sent to an input terminal (e.g., a negative input terminal) of a comparator 123. The ripple voltage $V_{RIPPLE}$ is generated by filtering a voltage at the I/O pin 113 using a ripple re-constructor 117. The ripple re-constructor 117 may be a filter (e.g., a low-pass filter) or other suitable circuits to re-shape the voltage at the I/O pin 113 to form the ripple voltage $V_{RIPPLE}$. Ripple re-constructor 117 is known and used in the art, thus details are not discussed here.

In FIG. 1, a reference voltage 132, also referred to as a soft start reference voltage 132, or a reference voltage $V_{REF\_SOFT}$, is generated by a reference voltage generator 131 and sent to another input terminal (e.g., the positive input terminal) of the comparator 123. In the example of FIG. 1, an output signal 124 of the comparator 123, also referred to as the Comp_Out signal, has a logic high value (e.g., a digital value of 1) when the reference voltage $V_{REF\_SOFT}$ is higher than the feedback voltage $V_{FB}$, and has a logic low value (e.g., a digital value of 0) when the reference voltage $V_{REF\_SOFT}$ is lower than the feedback voltage $V_{FB}$.

Figure 4:
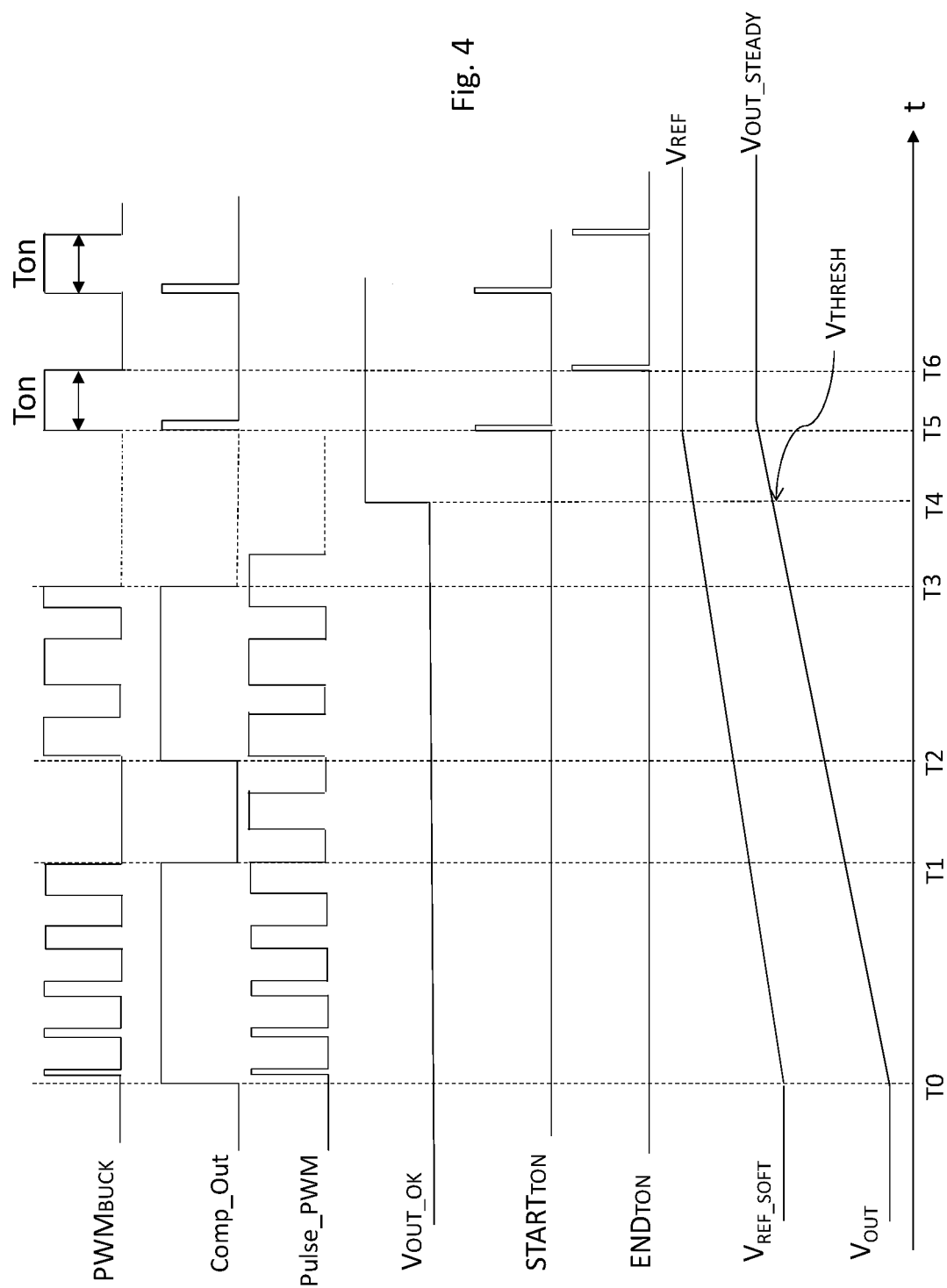
FIG. 4 illustrates a timing diagram for the SMPS of FIG. 1, in an embodiment.

In an embodiment, the reference voltage generator 131 is a circuit configured to generate the reference voltage $V_{REF\_SOFT}$ that increases from a first value (e.g., a zero voltage) to a second value (e.g., a pre-determined voltage $V_{REF}$) during a period of time. FIG. 4 shows an example of the reference voltage $V_{REF\_SOFT}$, which increase linearly from a first value (e.g., zero) to a final value (e.g., $V_{REF}$) from time T0 to time T5 during a soft startup process of the Buck converter. Note that unlike the reference voltage of electric ground, which has a static or fixed voltage value (e.g., zero voltage), the reference voltage $V_{REF\_SOFT}$ increases continuously (e.g., linearly) from a first value to a second value during the soft startup process of the Buck converter.

Referring back to FIG. 1, the reference voltage generator 131 receives the pre-determined voltage $V_{REF}$, which may be derived from the supply voltage $V_{IN}$ internally (e.g., through a voltage divider, not shown), or may be received from another I/O pin as an external signal (e.g., external to the SMPS 100).

FIG. 1 further illustrates a pulse width modulator 133, which modulates the pulse width of a clock signal CLK in accordance with the voltage value of the reference voltage $V_{REF\_SOFT}$ to generate an output signal 134 (e.g., a pulse width modulated (PWM) signal). In an embodiment, the pulse width of the modulated clock signal CLK (which is the output signal 134) is proportional to the value of the reference voltage $V_{REF\_SOFT}$, while the frequency of the modulated clock signal CLK is the same as the clock signal CLK. Note that the value of the reference voltage $V_{REF\_SOFT}$ increases from a first value to a second value during the soft startup process of the Buck converter. Therefore, the output signal 134 (also referred to as the Pulse_PWM signal) includes a plurality of pulses with a time-varying pulse width that increases (e.g., monotonously increases) with the reference voltage $V_{REF\_SOFT}$ during the soft startup process of the Buck converter. FIG. 4 illustrates an example of the Pulse_PWM signal between time T0 and time T3. The clock signal CLK in FIG. 1 may be provided to an I/O pin of the SMPS 100 as an external signal, or may be generated internally.

The output signal 124 of the comparator 123 and the output signal 134 of the pulse width modulator 133 are sent to input terminals of an AND gate 125, which performs a logic AND operation on the output signal 124 and the output signal 134 to produce an output signal 126. The output signal 126 (also referred to as the first control signal P1) is therefore a gated PWM signal. As described in more details hereinafter, during the soft startup process of the Buck converter, the first control signal P1 is used as the control signal 128 for the Buck converter to start the Buck converter initially, and once the output voltage $V_{OUT}$ of the Buck converter rises above a pre-determined threshold, a second control signal P2 generated by a pulse generator 135 is used as the control signal 128 for the Buck converter.

FIG. 1 further illustrates the pulse generator 135, which generates an output signal 136 (also referred to as the second control signal P2). In some embodiments, in response to a rising edge in the Comp_Out signal, a pulse with a pulse width $T_{ON}$ is generated in the output signal 136. An embodiment of the pulse generator 135 is shown in FIG. 2.

Figure 2:
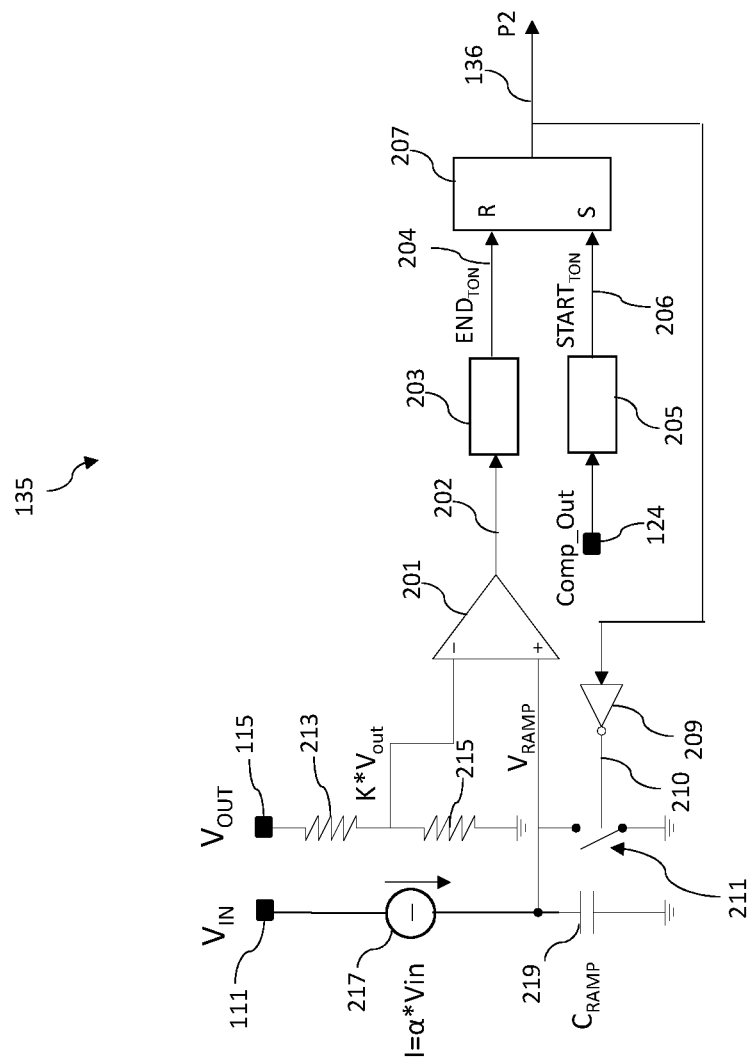
FIG. 2 illustrates a block diagram of a pulse generator, in an embodiment.

FIG. 2 illustrates a block diagram of the pulse generator 135, in an embodiment. In FIG. 2, the pulse generator 135 includes a comparator 201. A first input terminal (e.g., a negative input terminal) of the comparator 201 is coupled to an output of a voltage divider formed by resistors 213 and 215. The resistors 213 and 215 are coupled between the I/O pin 115 and a reference voltage (e.g., electrical ground). The voltage divider provides a scaled version of the output voltage $V_{OUT}$ of Buck converter, denoted as $K \times V_{OUT}$, to the first input terminal of the comparator 201, where K is a constant scaling factor.

A second input terminal (e.g., a positive input terminal) of the comparator 201 is coupled to a node between a current source 217 and a capacitor 219. In the example of FIG. 2, the current source 217 is coupled to the I/O pin 111, and the current provided by the current source 217 is denoted as $I=\alpha \times V_{IN}$, where $\alpha$ is a constant, and $V_{IN}$ is the supply voltage of the SMPS 100. The capacitance of the capacitor 219 is denoted as $C_{RAMP}$. The second input terminal of the comparator 201 is also coupled to a switch 211 (e.g., a transistor, a pass gate, or the like). The switch 211 is controlled by a control signal 210 at the output of an inverter 209. The input terminal of the inverter 209 is coupled to an output terminal of a flip-flop 207.

Still referring to FIG. 2, the output signal 202 of the comparator 201 is sent to an edge detector 203. The edge detector 203 is configured to detect a rising edge in the output signal 202 and generate a short pulse (referred to as a $END_{TON}$ pulse) that starts at the rising edge of the output signal 202. FIG. 2 also illustrates another edge detector 205. The edge detector 205 is configured to receive the Comp_Out signal from the comparator 123 of FIG. 1, detect a rising edge in the Comp_Out signal, and generate a short pulse (referred to as a $START_{TON}$ pulse) that starts at the rising edge of the Comp_Out signal. Each $START_{TON}$ pulse and a respective $END_{TON}$ pulse are used to generate a pulse signal, details are discussed below with reference to FIGS. 2 and 3.

In the example of FIG. 2, the output signal 206 (e.g., the $START_{TON}$ pulse) of the edge detector 205 is sent to a SET (S) terminal of a flip-flop 207, and the output signal 204 (e.g., the $END_{TON}$ pulse) of the edge detector 203 is sent to a RESET (R) terminal of the flip-flop 207. The flip-flop 207 may be, e.g., a Set-Reset (SR) latch that is formed by a pair of cross-coupled NOR gates. In some embodiments, the output signal 136 of the flip-flop 207 maintains its current value when the SET terminal and the RESET terminal are in the logic low state (e.g., signals at the SET and RESET terminals have the logic low value). If the SET terminal is pulsed high while the RESET terminal is held low, then the output signal 136 is forced high, and stays high when the SET terminal returns to low; similarly, if the RESET is pulsed high while the SET terminal is held low, then the output signal 136 is forced low, and stays low when the RESET terminal returns to low.

Figure 3:
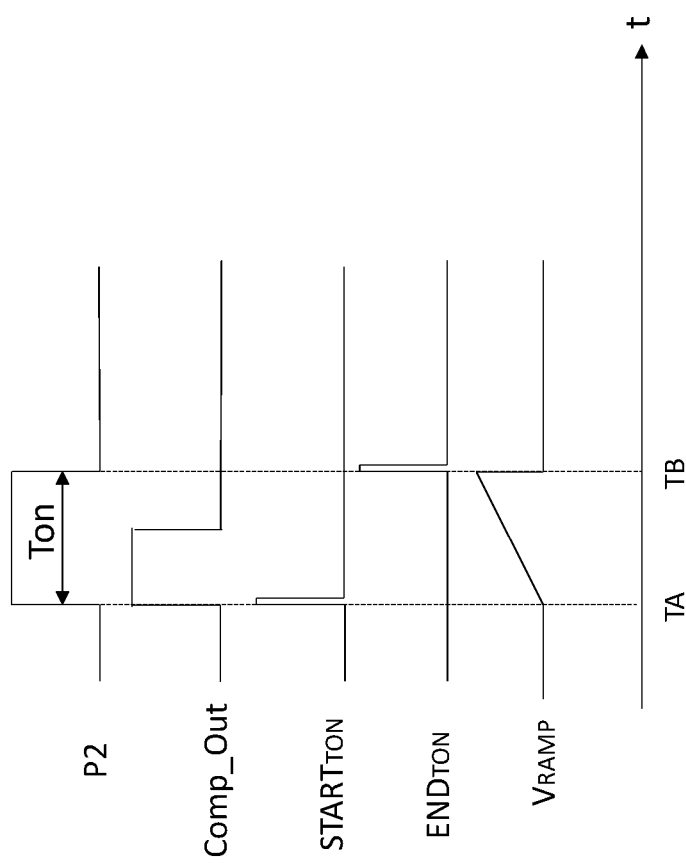
FIG. 3 illustrates a timing diagram for the pulse generator of FIG. 2, in an embodiment.

FIG. 3 illustrates how the pulse generator of FIG. 2, in response to a rising edge in the Comp_Out signal, generates a pulse in the output signal 136 (also referred to as the second control signal $P_2$), where the pulse has a pulse width $T_{ON}$ that is proportional to $V_{OUT}/V_{IN}$, in an embodiment. The process shown in FIG. 3 is repeated during operation of the Buck converter to generate a plurality of pulses during at least the second stage of the soft startup process discussed below.

In the example of FIG. 3, the output signal 136 of the flip-flop 207 (e.g., the second control signal $P_2$) has a logic low value initially (e.g., after powering up). The control signal 210 in FIG. 2 (which is the inverse of the output signal 136) therefore has a logic high value initially, which closes the switch 211 to pull down the voltage at the second input terminal (e.g., the positive input terminal) of the comparator 201 to electrical ground. As a result, the output signal 202 has the logic low value initially.

Referring to FIGS. 2 and 3, at time TA, the Comp_Out signal changes from logic low to logic high, thereby forming a rising edge. In response to the rising edge in the Comp_Out signal, the edge detector 205 generates a $START_{TON}$ pulse at time TA. Note that the output signal 204 of the edge detector 203 is still at logic low at time TA. Therefore, the $START_{TON}$ pulse set the output signal 136 (illustrated as the second control signal P2 in FIG. 3) of the flip-flop 207 to logic high at time TA. Accordingly, the control signal 210, which is the inverse of the output signal 136, turns into logic low, thereby opening the switch 211.

When the switch 211 is switched from the closed position to the open position, the current source 217 starts charging the capacitor 219, and the voltage across the capacitor 219, illustrated as the $V_{RAMP}$ signal in FIG. 3, starts to increase as the charging processes continues. At time TB, the voltage across the capacitor 219 rises above the value $K \times V_{OUT}$, and therefore, the output signal 202 of the comparator 201 turns from logic low to logic high, resulting in a rising edge. In response, the edge detector 203 generates an $END_{TON}$ pulse at time TB. Note that the output signal 206 of the edge detector 205 at time TB has the logic low value, and therefore, the $END_{TON}$ pulse resets the flip-flop 207 such that the second control signal P2 changes into the logic low value.

As discussed above, the pulse width of the second control signal P2 in FIG. 2, denoted as $T_{ON}$, is determined by the duration between time TA and time TB. One skilled in the art will readily appreciate that due to the linear increase of the voltage $V_{RAMP}$ during the charging process, the pulse width $T_{ON}$ is given by:

$$T_{ON} = \frac{C_{RAMP}}{\alpha * V_{IN}} K * V_{OUT} = \delta * \frac{V_{OUT}}{V_{IN}} \quad (1)$$

where $$\delta = \frac{K * C_{RAMP}}{\alpha}.$$

In other words, the pulse width $T_{ON}$ is proportional to the ratio of $V_{OUT}/V_{IN}$.

At the beginning of a soft startup process for the Buck converter, the output voltage $V_{OUT}$ of the Buck converter is zero. According to Equation (1), the pulse width $T_{ON}$ of the second control signal P2 should theoretically be zero at the beginning of the soft startup process. In a real circuit, due to, e.g., propagation delay, the pulse width $T_{ON}$ may have a short duration of, e.g., a few nanoseconds at the beginning of the soft startup process, which is still too short to be used as the control signal 128 for the Buck converter. Therefore, it would be problematic to start the Buck converter from the beginning using the second control signal P2. The present disclosure solves the problem by starting the Buck converter using the first control signal P1 (e.g., to drive the Buck converter with the first control signal P1) initially, then switch to the second control signal P2 after the output voltage $V_{OUT}$ of the Buck converter rises above a threshold, details are discussed hereinafter.

Referring back to FIG. 1, the SMPS 100 includes a voltage checking circuit 137 configured to compare the output voltage $V_{OUT}$ of the Buck converter with a pre-determined threshold $V_{THRESH}$. The pre-determined threshold $V_{THRESH}$ is a voltage high enough to allow the pulse generator 135 to generate the second control signal P2 with pulse width $T_{ON}$ (which is proportional to $V_{OUT}/V_{IN}$) that is long enough to properly drive the Buck converter. For example, the pre-determined threshold $V_{THRESH}$ may be between about 85% and about 95%, such as 90%, of a target output voltage $V_{OUT\_STEADY}$ (also referred to as the steady state output voltage $V_{OUT\_STEADY}$) of the Buck converter. The voltage checking circuit 137 may be or include a comparator that compares the output voltage $V_{OUT}$ with the pre-determined threshold $V_{THRESH}$. An output signal 138 of the voltage checking circuit 137, also referred to as the $V_{OUT\_OK}$ signal, has the logic high value when the output voltage $V_{OUT}$ of the Buck converter is higher than the pre-determined threshold $V_{THRESH}$, and has the logic low value when the output voltage $V_{OUT}$ of the Buck converter is lower than the pre-determined threshold $V_{THRESH}$.

FIG. 1 further illustrates a selection circuit 127, which is illustrated as a multiplexer (MUX) in FIG. 1, although any suitable selection circuit may be used. The selection circuit 127 is also referred to as MUX 127 in the discussion herein, with the understanding that any selection circuit 127 capable of selecting one out of two input signals as the output signal may be used.

As illustrated in FIG. 1, input terminals of the MUX 127 are coupled to the first control signal P1 (e.g., a gated PWM signal) and the second control signal P2 (e.g., a PWM signal). The output of the MUX 127 is selected by a control signal of the MUX 127, which control signal is the $V_{OUT\_OK}$ signal from the voltage checking circuit 137. In an embodiment, when the $V_{OUT\_OK}$ signal is logic low, the first control signal P1 is selected as the output of the MUX 127; when the $V_{OUT\_OK}$ signal is logic high, the second control signal P2 is selected as the output of the MUX 127. The output of the MUX 127, also referred to as the $PWM_{Buck}$ signal, is the control signal 128 sent to the gate driver circuit 105 and used for driving the Buck converter (e.g., controls the operation of the switch(es) of the Buck converter).

The $V_{OUT\_OK}$ signal may be optionally used as an enable signal for the pulse width modulator 133 and the pulse generator 135, as illustrated by the dashed arrowed-lines in FIG. 1. For example, when the $V_{OUT\_OK}$ signal has the logic low value, the pulse width modulator 133 is enabled and the pulse generator 135 is disabled. Conversely, when the $V_{OUT\_OK}$ signal has the logic high value, the pulse width modulator 133 is disabled and the pulse generator 135 is enabled.

Operation of the SMPS 100 is now described with reference to FIGS. 1 and 4. FIG. 4 illustrates a timing diagram for different signals of the SMPS 100 of FIG. 1, in an embodiment.

Referring to FIGS. 1 and 4, at time T0, the SMPS 100 starts the soft startup process. The reference voltage $V_{REF\_SOFT}$, generated by the reference voltage generator 131, starts to increase (e.g., linearly) from a first value (e.g., 0 volt) to a second value (e.g., $V_{REF}$) during a period of time from time T0 to time T5. Since the output voltage $V_{OUT}$ is still zero at time T0, the Comp_Out signal generated by the comparator 123 turns to the logic high value at time T0. The pulse width modulator 133 starts generating the Pulse_PWM signal at time T0. As illustrated in FIG. 4, the pulse width of the Pulse_PWM signal is proportional to the reference voltage $V_{REF\_SOFT}$, and therefore, is time-varying and increases over time.

At the first stage of the soft startup process (e.g., between time T0 and time T4), since the output voltage $V_{OUT}$ of the Buck convert is below the pre-determined threshold $V_{THRESH}$, the $V_{OUT\_OK}$ signal generated by the voltage checking circuit 137 has a logic low value. Therefore, the MUX 127 selects the first control signal P1 as the $PWM_{Buck}$ signal to control operation of the Buck converter. As illustrated in FIG. 4, the $PWM_{Buck}$ signal during the first stage of the soft startup process (e.g., between time T0 and time T4) is the first control signal P1 formed by gating the Pulse_PWM signal by the Comp_Out signal. The Buck converter is driven by the $PWM_{Buck}$ signal starting from time T0, and its output voltage $V_{OUT}$ follows the reference voltage $V_{REF\_SOFT}$ and also starts to increase. As illustrated in FIG. 4, during the first stage of the soft startup process, the Comp_Out signal may turn into the logic low value when the feedback voltage $V_{FB}$ rises above the reference voltage $V_{REF\_SOFT}$.

At time T4, the output voltage $V_{OUT}$ of the Buck converter rises above the pre-determined threshold $V_{THRESH}$. As a result, the $V_{OUT\_OK}$ signal generated by the voltage checking circuit 137 turns into a logic high value at time T4. In response, the MUX 127 now selects the second control signal P2 generated by the pulse generator 135 as the $PWM_{Buck}$ signal to control operation of the Buck converter. The soft startup process enters the second stage after time T4.

As illustrated in FIG. 4, in the second stage of the soft startup process, the $PWM_{Buck}$ signal includes pulses with pulse width $T_{ON}$, where $T_{ON}$ is determined by, e.g., Equation (1). FIG. 4 illustrates how each pulse of duration $T_{ON}$ is generated by a pair of $START_{TON}$ pulse and $END_{TON}$ pulse.

The output voltage $V_{OUT}$ of the Buck converter continues to rise from time T4 to time T5. At time T5, the reference voltage $V_{REF\_SOFT}$ reaches the value of $V_{REF}$, and the output voltage $V_{OUT}$ of the Buck converter reaches its steady state output voltage $V_{OUT\_STEADY}$. FIG. 4 does not illustrate pulses of the $PWM_{Buck}$ signal between time T4 and time T5. If pulses were generated between time T4 and time T5, the pulse width $T_{ON}$ would increase between time T4 and time T5. At time T5, the pulse width $T_{ON}$ reaches a final, fixed nominal value determined by $V_{OUT\_STEADY}/V_{IN}$. One skilled in the art will readily recognize that the SMPS 100, when operating in the second stage (e.g., driven by the control signal P2) of the soft startup process, is referred to as operating with adaptive constant on-time (ACOT) control. Therefore, during the first stage of the soft startup process, the ACOT control is disabled, and the Buck converter is controlled (e.g., driven) by the first control signal P1.

Note that in FIG. 4, for simplicity, the Pulse_PWM signal after around time T4 is not plotted, and the $START_{TON}$ pulse and $END_{TON}$ pulse are not plotted before time T4. In embodiments where the $V_{OUT\_OK}$ signal is used to enable/disable the pulse width modulator 133 and the pulse generator 135, the Pulse_PWM signal is not generated after time T4, and the $START_{TON}$ pulse and $END_{TON}$ pulse are not generated before time T4.

Figure 5:
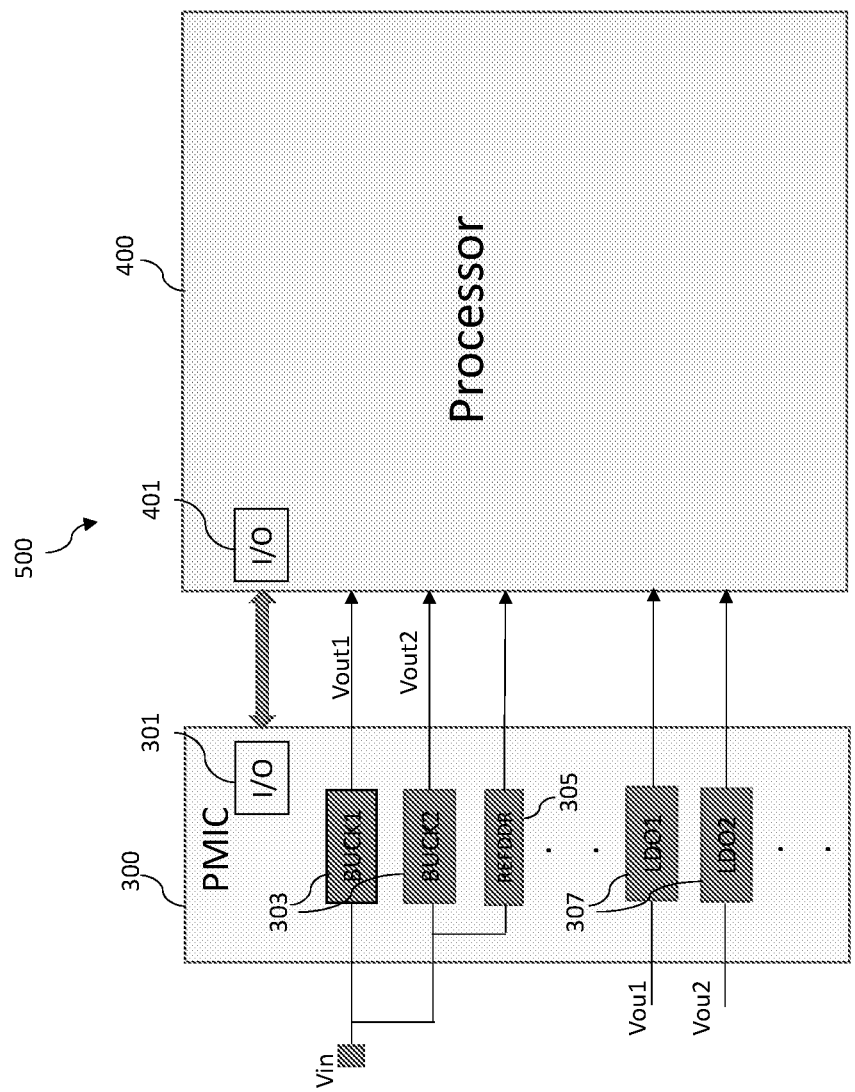
FIG. 5 illustrates a block diagram of a system including a power management integrated circuit (PMIC) device and a processor, in an embodiment.

FIG. 5 illustrates a block diagram of a system 500 including a power management integrated circuit (PMIC) device 300 and a processor 400, in an embodiment. The PMIC 300 includes a plurality of power supply circuits 303, 305, and 307. Each of the power supply circuits 303 may be the SMPS 100 of FIG. 1. The power supply circuits 307 may be low drop-out (LDO) power supplies. The power supply circuit 305 may be another type of power supply, such as a boost converter, a flyback converter, or the like.

In the example of FIG. 5, the power supply circuits 303 receive a supply voltage $V_{IN}$, and generates output voltages $V_{OUT1}$ and $V_{OUT2}$ for use by the processor 400. The power supply circuits 307 (e.g., LDO power supplies) may receive the output voltages $V_{OUT1}$ and $V_{OUT2}$, and generate well-regulated output voltages for use by the processor 400. In some embodiments, the output voltages $V_{OUT1}$ and $V_{OUT2}$ may provide higher driving capability (e.g., having higher electrical currents) but with more voltage ripples, and in contrast, the output of the power supply circuits 307 may have less voltage ripples but may provide lower driving capability.

The PMIC 300 has an I/O interface 301 (e.g., an I2C interface) for communicating with the processor 400 through an I/O interface 401 (e.g., an I2C interface) of the processor 400. The processor 400 may be or include a central processing unit (CPU), a micro-controller (MCU), a digital signal processor (DSP), or the like. The processor 400 may include memory modules (e.g., random-access memories (RAMs) and/or read-only memories (ROMs)), and may include peripheral circuits such as analog-to-digital converters (ADCs), digital-to-analog converters (DACs), or the like.

Figure 6:
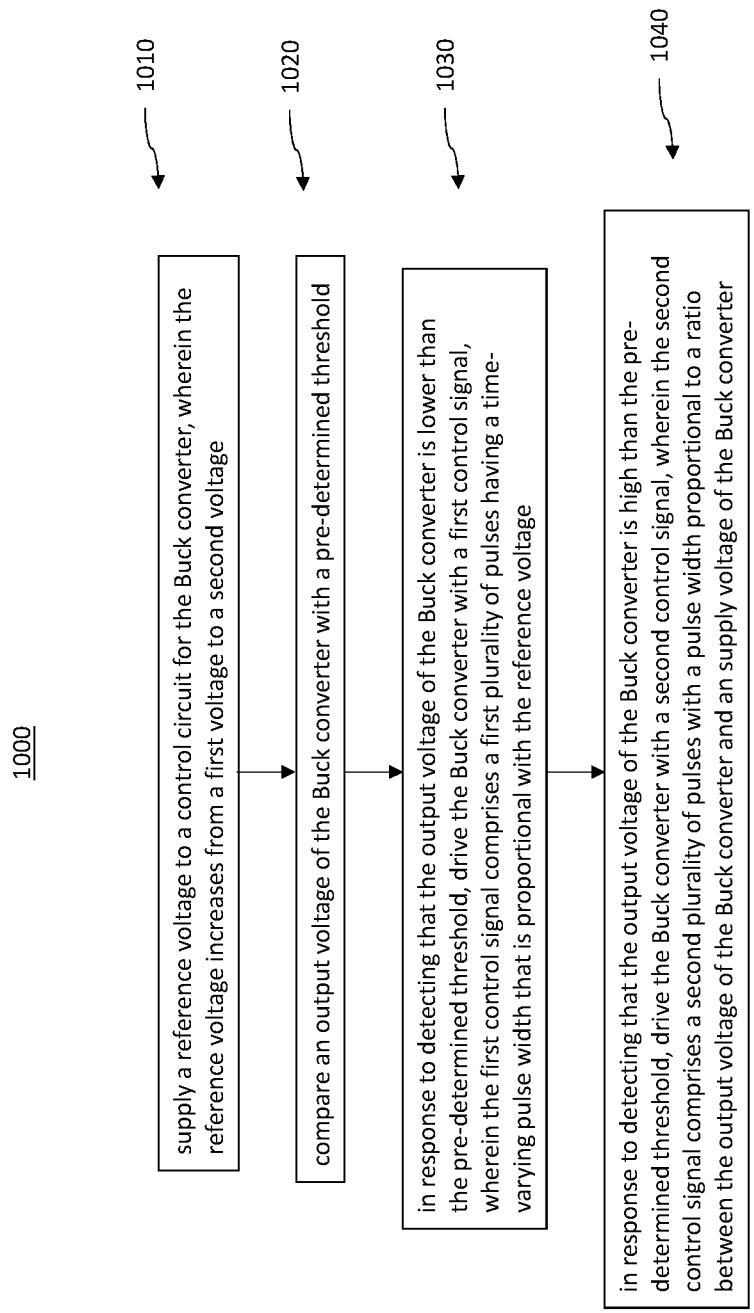
FIG. 6 illustrates a flow chart of a method of starting a Buck converter, in some embodiments.

FIG. 6 illustrates a flow chart of a method 1000 of starting a Buck converter, in some embodiments. It should be understood that the example method shown in FIG. 6 is merely an example of many possible example methods. One of ordinary skill in the art would recognize many variations, alternatives, and modifications. For example, various steps as illustrated in FIG. 6 may be added, removed, replaced, rearranged, or repeated.

Referring to FIG. 11 at block 1010, a reference voltage is supplied to a control circuit for the Buck converter, wherein the reference voltage increases from a first voltage to a second voltage. At block 1020, an output voltage of the Buck converter is compared with a pre-determined threshold. At block 1030, in response to detecting that the output voltage of the Buck converter is lower than the pre-determined threshold, the Buck converter is driven with a first control signal, wherein the first control signal comprises a first plurality of pulses having a time-varying pulse width that is proportional with the reference voltage. At block 1040, in response to detecting that the output voltage of the Buck converter is high than the pre-determined threshold, the Buck converter is driven with a second control signal, wherein the second control signal comprises a second plurality of pulses with a pulse width proportional to a ratio between the output voltage of the Buck converter and an supply voltage of the Buck converter.

Embodiments may achieve advantages as described below. For example, by using the first control signal P1 and the second control signal P2 to drive the Buck converter during the first stage and the second stage of the soft startup process, respectively, the disclosed SMPS 100 is able to achieve a smooth soft startup process that avoids or alleviates performance issues such as inrush current at startup or overshoot of output voltage.

To further appreciate the advantage of the disclosed SMPS and its soft start process, consider a reference design where at the beginning of the soft startup process, the pulse of the Comp_Out signal is used as the control signal 128 to drive the Buck converter such that the Buck converter output voltage $V_{OUT}$ increases to a certain level. A pulse counter is used to count the number of pulses in the Comp_Out signal. In some embodiments, after the pulse counter counts one pulse in the Comp_Out signal, the output signal 136 (e.g., the second control signal P2) of the pulse generator 135 is used as the control signal 128 to drive the Buck converter. The above described reference design may resolve the issue related with starting the Buck converter with a zero or near-zero PWM pulse width. However, since the pulse of the Comp_Out signal has a long, uncontrolled duration, it may cause a pedestal (e.g., a step) in the output voltage $V_{OUT}$ at startup, a condition in which the maximum voltage (e.g., $V_{IN}-V_{OUT}$) is present across the inductor 107. In some embodiments, during the long, uncontrolled duration of the pulse of the Comp_Out signal, a high current flows, suddenly charging the capacitor 109 and causing an unwanted step in the output voltage $V_{OUT}$ of the Buck converter. The unwanted step may be hundreds of millivolts. In applications where Buck converters are used in a PMIC (see, e.g., 300 in FIG. 5) to supply voltages to peripherals or the memory modules of a processor (see, e.g., 400 in FIG. 5), the target output voltages provided by the Buck converters may be below 1 V, so a pedestal of hundreds of millivolts is not acceptable. The present disclosure, by switching between the first control signal P1 and the second control signal P2 during the first stage and the second stage of the soft startup process, achieves a smooth output voltage $V_{OUT}$ and avoids the unwanted step in the output voltage $V_{OUT}$.

Examples of the present invention are summarized here. Other examples can also be understood from the entirety of the specification and the claims filed herein.

Example 1. In accordance with an embodiment, a switched-mode power supply (SMPS) includes: a Buck converter; and a control circuit for the Buck converter, which comprises: a comparator configured to compare a feedback voltage of the Buck converter with a reference voltage that increases from a first voltage to a second voltage; a pulse-width modulator configured to generate a pulse-width modulated (PWM) signal, wherein a pulse width of the PWM signal is timing-varying and is proportional to a value of the reference voltage; an AND gate, wherein a first input terminal of the AND gate and a second input terminal of the AND gate are coupled to an output terminal of the comparator and an output terminal of the pulse-width modulator, respectively; a pulse generator coupled to the output terminal of the comparator and configured to generate a pulse in response to a rising edge in an output signal of the comparator; and a selection circuit coupled to the AND gate and the pulse generator, wherein the selection circuit is configured to, based on an output voltage of the Buck converter, select an output of the AND gate or an output of the pulse generator as an output of the selection circuit, wherein the Buck converter is configured to be controlled by the output of the selection circuit.

Example 2. The SMPS of Example 1, wherein the selection circuit is configured to: select the output of the AND gate as the output of the selection circuit when the output voltage of the Buck converter is below a pre-determined threshold; and select the output of the pulse generator as the output of the selection circuit when the output voltage of the Buck converter is above the pre-determined threshold.

Example 3. The SMPS of Example 2, wherein the feedback voltage is applied to a first input terminal of the comparator, and the reference voltage is applied to a second input terminal of the comparator.

Example 4. The SMPS of Example 3, wherein the first input terminal is a negative terminal of the comparator, and the second input terminal is a positive terminal of the comparator.

Example 5. The SMPS of Example 3, further comprising a voltage divider coupled to an output terminal of the Buck converter configured to generate a scaled version of the output voltage of the Buck converter.

Example 6. The SMPS of Example 5, further comprising: a ripple re-constructor coupled to an input/output (I/O) terminal of the Buck converter and configured to generate a ripple voltage; and an adder circuit, wherein the adder circuit is configured to add the ripple voltage with the scaled version of the output voltage of the Buck converter to generate the feedback voltage.

Example 7. The SMPS of Example 2, further comprising a voltage checking circuit configured to compare the output voltage of the Buck converter with the pre-determined threshold.

Example 8. The SMPS of Example 2, wherein a duration of the pulse generated by the pulse generator is proportional to a ratio between an output voltage of the Buck converter and a supply voltage for the pulse generator.

Example 9. The SMPS of Example 2, wherein the Buck converter comprises a gate driver circuit configured to drive one or more switches of the Buck converter, wherein the output of the selection circuit is coupled to the gate driver circuit.

Example 10. The SMPS of Example 2, further comprising a reference signal generator configured to generate the reference voltage, wherein an output terminal of the reference signal generator is coupled to an input terminal of the pulse-width modulator and to an input terminal of the comparator.

Example 11. The SMPS of Example 10, wherein the first voltage is zero.

Example 12. The SMPS of Example 11, wherein the reference voltage increases from the first voltage to the second voltage linearly.

Example 13. In accordance with an embodiment, an integrated circuit (IC) device includes: a Buck converter; and a control circuit for the Buck converter, which comprises: a comparator configured to compare a feedback voltage of the Buck converter with a reference voltage that increases from a first voltage to a second voltage; a pulse-width modulator configured to generate a pulse-width modulated (PWM) signal having a timing-varying pulse width that is proportional to a value of the reference voltage; an AND gate configured to generate a first control signal by performing a logic AND operation on an output signal of the comparator and the PWM signal; a pulse generator configured to generate a second control signal by generating a pulse in response to a rising edge in the output signal of the comparator; and a selection circuit configured to, based on an output voltage of the Buck converter, select the first control signal or the second control signal as a control signal for the Buck converter.

Example 14. The IC device of Example 13, wherein the selection circuit is configured to: select the first control signal as the control signal for the Buck converter when the output voltage of the Buck converter is below a pre-determined threshold; and select the second control signal as the control signal for the Buck converter when the output voltage of the Buck converter is above the pre-determined threshold.

Example 15. The IC device of Example 14, wherein the Buck converter has one or more switches that are turned on and off alternately during normal operation of the Buck converter, wherein the control signal of the Buck converter controls operation of the one or more switches during the normal operation of the Buck converter.

Example 16. The IC device of Example 14, wherein the control circuit further comprises a reference voltage generator configured to generate the reference voltage.

Example 17. The IC device of Example 14, wherein the control circuit further comprises a voltage checking circuit configured to compare the output voltage of the Buck converter with the pre-determined threshold.

Example 18. In accordance with an embodiment, a method of starting a Buck converter includes: supplying a reference voltage to a control circuit for the Buck converter, wherein the reference voltage increases from a first voltage to a second voltage; comparing an output voltage of the Buck converter with a pre-determined threshold; in response to detecting that the output voltage of the Buck converter is lower than the pre-determined threshold, driving the Buck converter with a first control signal, wherein the first control signal comprises a first plurality of pulses having a time-varying pulse width that is proportional with the reference voltage; and in response to detecting that the output voltage of the Buck converter is high than the pre-determined threshold, driving the Buck converter with a second control signal, wherein the second control signal comprises a second plurality of pulses with a pulse width proportional to a ratio between the output voltage of the Buck converter and an supply voltage of the Buck converter.

Example 19. The method of Example 18, further comprising: generating the first control signal by: comparing, using a first comparator, a feedback voltage of the Buck converter with the reference voltage; modulating a pulse width of a clock signal with the reference voltage such that the pulse width of the modulated clock signal increases with the reference voltage; and performing a logic AND operation on an output signal of the first comparator and the modulated clock signal to generate the first control signal.

Example 20. The method of claim 19, further comprising generating the second control signal by: detecting a rising edge in the output signal of the first comparator; in response to detecting the rising edge in the output signal of the first comparator: setting an output of a Set-Reset (SR) latch to a logic high value; and starting charging a capacitor using a current source, wherein the capacitor is coupled between a second input terminal of a second comparator and electrical ground, wherein a first input terminal of the second comparator is supplied with a scaled version of the output voltage of the Buck converter; detecting a rising edge in an output signal of the second comparator; and in response to detecting the rising edge in the output signal of the second comparator: resetting the output of the SR latch to a logic low value, wherein the output of the SR latch is the second control signal; and forcing a voltage at the second input terminal of the second comparator to electrical ground.

While this invention has been described with reference to illustrative examples, this description is not intended to be construed in a limiting sense. Various modifications and combinations of the illustrative examples, as well as other examples of the invention, will be apparent to persons skilled in the art upon reference to the description. It is therefore intended that the appended claims encompass any such modifications or examples.

What is claimed is:

1. A switched-mode power supply (SMPS) comprising:
a Buck converter; and
a control circuit for the Buck converter, comprising:
a comparator configured to compare a feedback voltage of the Buck converter with a reference voltage that increases from a first voltage to a second voltage;
a pulse-width modulator configured to generate a pulse-width modulated (PWM) signal, wherein a pulse width of the PWM signal is timing-varying and is proportional to a value of the reference voltage;
an AND gate, wherein a first input terminal of the AND gate and a second input terminal of the AND gate are coupled to an output terminal of the comparator and an output terminal of the pulse-width modulator, respectively;
a pulse generator coupled to the output terminal of the comparator and configured to generate a pulse in response to a rising edge in an output signal of the comparator; and
a selection circuit coupled to the AND gate and the pulse generator, wherein the selection circuit is configured to, based on an output voltage of the Buck converter, select an output of the AND gate or an output of the pulse generator as an output of the selection circuit, wherein the Buck converter is configured to be controlled by the output of the selection circuit.

2. The SMPS of claim 1, wherein the selection circuit is configured to:
select the output of the AND gate as the output of the selection circuit when the output voltage of the Buck converter is below a pre-determined threshold; and
select the output of the pulse generator as the output of the selection circuit when the output voltage of the Buck converter is above the pre-determined threshold.

3. The SMPS of claim 2, wherein the feedback voltage is applied to a first input terminal of the comparator, and the reference voltage is applied to a second input terminal of the comparator.

4. The SMPS of claim 3, wherein the first input terminal is a negative terminal of the comparator, and the second input terminal is a positive terminal of the comparator.

5. The SMPS of claim 3, further comprising a voltage divider coupled to an output terminal of the Buck converter configured to generate a scaled version of the output voltage of the Buck converter.

6. The SMPS of claim 5, further comprising:
a ripple re-constructor coupled to an input/output (I/O) terminal of the Buck converter and configured to generate a ripple voltage; and
an adder circuit, wherein the adder circuit is configured to add the ripple voltage with the scaled version of the output voltage of the Buck converter to generate the feedback voltage.

7. The SMPS of claim 2, further comprising a voltage checking circuit configured to compare the output voltage of the Buck converter with the pre-determined threshold.

8. The SMPS of claim 2, wherein a duration of the pulse generated by the pulse generator is proportional to a ratio between the output voltage of the Buck converter and a supply voltage for the pulse generator.

9. The SMPS of claim 2, wherein the Buck converter comprises a gate driver circuit configured to drive one or more switches of the Buck converter, wherein the output of the selection circuit is coupled to the gate driver circuit.

10. The SMPS of claim 2, further comprising a reference signal generator configured to generate the reference voltage, wherein an output terminal of the reference signal generator is coupled to an input terminal of the pulse-width modulator and to an input terminal of the comparator.

11. The SMPS of claim 10, wherein the first voltage is zero.

12. The SMPS of claim 11, wherein the reference voltage increases from the first voltage to the second voltage linearly.

13. An integrated circuit (IC) device comprising:
a Buck converter; and
a control circuit for the Buck converter, comprising:
a comparator configured to compare a feedback voltage of the Buck converter with a reference voltage that increases from a first voltage to a second voltage;
a pulse-width modulator configured to generate a pulse-width modulated (PWM) signal having a timing-varying pulse width that is proportional to a value of the reference voltage;
an AND gate configured to generate a first control signal by performing a logic AND operation on an output signal of the comparator and the PWM signal;
a pulse generator configured to generate a second control signal by generating a pulse in response to a rising edge in the output signal of the comparator; and
a selection circuit configured to, based on an output voltage of the Buck converter, select the first control signal or the second control signal as a control signal for the Buck converter.

14. The IC device of claim 13, wherein the selection circuit is configured to:
select the first control signal as the control signal for the Buck converter when the output voltage of the Buck converter is below a pre-determined threshold; and
select the second control signal as the control signal for the Buck converter when the output voltage of the Buck converter is above the pre-determined threshold.

15. The IC device of claim 14, wherein the Buck converter has one or more switches that are turned on and off alternately during normal operation of the Buck converter, wherein the control signal of the Buck converter controls operation of the one or more switches during the normal operation of the Buck converter.

16. The IC device of claim 14, wherein the control circuit further comprises a reference voltage generator configured to generate the reference voltage.

17. The IC device of claim 14, wherein the control circuit further comprises a voltage checking circuit configured to compare the output voltage of the Buck converter with the pre-determined threshold.

18. A method of starting a Buck converter, the method comprising:
   supplying a reference voltage to a control circuit for the Buck converter, wherein the reference voltage increases from a first voltage to a second voltage;
   comparing an output voltage of the Buck converter with a pre-determined threshold;
   in response to detecting that the output voltage of the Buck converter is lower than the pre-determined threshold, driving the Buck converter with a first control signal, wherein the first control signal comprises a first plurality of pulses having a time-varying pulse width that is proportional with the reference voltage; and
   in response to detecting that the output voltage of the Buck converter is higher than the pre-determined threshold, driving the Buck converter with a second control signal, wherein the second control signal comprises a second plurality of pulses with a pulse width proportional to a ratio between the output voltage of the Buck converter and a supply voltage of the Buck converter.

19. The method of claim 18, further comprising:
generating the first control signal by:
   comparing, using a first comparator, a feedback voltage of the Buck converter with the reference voltage;
   modulating a pulse width of a clock signal with the reference voltage such that the pulse width of the modulated clock signal increases with the reference voltage; and
   performing a logic AND operation on an output signal of the first comparator and the modulated clock signal to generate the first control signal.

20. The method of claim 19, further comprising:
generating the second control signal by:
detecting a rising edge in the output signal of the first comparator;
in response to detecting the rising edge in the output signal of the first comparator:
setting an output of a Set-Reset (SR) latch to a logic high value; and
starting charging a capacitor using a current source, wherein the capacitor is coupled between a second input terminal of a second comparator and electrical ground, wherein a first input terminal of the second comparator is supplied with a scaled version of the output voltage of the Buck converter;
detecting a rising edge in an output signal of the second comparator; and
in response to detecting the rising edge in the output signal of the second comparator:
resetting the output of the SR latch to a logic low value, wherein the output of the SR latch is the second control signal; and
forcing a voltage at the second input terminal of the second comparator to electrical ground.

* * * * *